United States Patent
Darimont-Nicolau et al.

(10) Patent No.: US 12,539,322 B2
(45) Date of Patent: Feb. 3, 2026

(54) USE OF MULBERRY EXTRACT FOR CONTROLLING POSTPRANDIAL GLUCOSE RESPONSE

(71) Applicant: SOCIETE DES PRODUITS NESTLE S.A., Vevey (CH)

(72) Inventors: Christian Darimont-Nicolau, Lausanne (CH); Leonie Egli, La Tour-de-Peilz (CH); Nele Gheldof, Cugy (CH); Andreas Rytz, Carrouge (CH); Shreeram Sathyavageeswaran, Singapore (SG)

(73) Assignee: Societe des Produits Nestle S.A., Vevey (CH)

( * ) Notice: Subject to any disclaimer, the term of this patent is extended or adjusted under 35 U.S.C. 154(b) by 501 days.

(21) Appl. No.: 17/996,652

(22) PCT Filed: Apr. 23, 2021

(86) PCT No.: PCT/EP2021/060744
§ 371 (c)(1),
(2) Date: Oct. 20, 2022

(87) PCT Pub. No.: WO2021/214326
PCT Pub. Date: Oct. 28, 2021

(65) Prior Publication Data
US 2023/0248794 A1  Aug. 10, 2023

(30) Foreign Application Priority Data
Apr. 24, 2020 (EP) .................................... 20171278
Aug. 27, 2020 (EP) .................................... 20193063

(51) Int. Cl.
A61K 36/605 (2006.01)
A61K 9/00 (2006.01)
A61K 45/06 (2006.01)
A61P 3/10 (2006.01)

(52) U.S. Cl.
CPC .......... *A61K 36/605* (2013.01); *A61K 9/0053* (2013.01); *A61K 45/06* (2013.01); *A61P 3/10* (2018.01)

(58) Field of Classification Search
None
See application file for complete search history.

(56) References Cited

U.S. PATENT DOCUMENTS

2007/0166320 A1* 7/2007 Yamazaki ............... A23L 31/00
424/641
2014/0328950 A1  11/2014 Gallagher et al.

FOREIGN PATENT DOCUMENTS

| CN | 101020655 A | 8/2007 |
| CN | 102964460 A | 3/2013 |
| CN | 106456692 A | 2/2017 |
| CN | 109349490 | 2/2019 |
| CN | 110327456 | 10/2019 |
| JP | 2012207009 | 10/2012 |
| JP | 2014161295 A | 9/2014 |
| JP | 2016516443 A | 6/2016 |

OTHER PUBLICATIONS

Qiuli, "Basic Research and Clinical Practice of Modern Traditional Chinese Medicine", Modern Principles & Clinic on Chinese Materia Medica, Jun. 30, 2012, p. 1106.
Office Action Received for Application No. CN202180023167.8, mailed on Oct. 15, 2024, 12 Pages of Official Copy.
Chinese Office Action for Appl No. 202180023167.8 dated Aug. 1, 2024, 12 pages.
Chinese Office Action for Appl No. 202180023167.8 dated Oct. 21, 2023.
Jeong et al. "Enhancement of 1-Deoxynojirimycin Content and a-Glucosidase Inhibitory Activity in Mulberry Leaf Using Various Fermenting Microorganisms Isolated from Korean Traditional Fermented Food" Biotechnology and Bioprocess Engineering, 2014, vol. 19, pp. 1114-1118.
Nakamura et al., "Suppressive Effect of Extractive from Leaves of Morus Alba with a-Glucosidase Inhibitors on Human Postprandial Blood Glucose Elevation Induced by Starchy Foods", Journal of Nutrition, vol. 68, Issue No. 6, 2010, pp. 351-358.
Office Action Received for Application No. JP2022-562138, mailed on Apr. 30, 2025, 8 Pages(4 Pages of English Translation and 4 Pages of Official Copy).
Lingrui, "Medicinal Records of the Dabie Mountains", 2010, pp. 288.
Chinese Office Action for Appl No. 202180023167.8 dated Jul. 9, 2025, 5 pages.
Japanese Office Action for Appl No. 2022-562138 dated Oct. 21, 2025, 4 pages.

* cited by examiner

*Primary Examiner* — Robert A Wax
*Assistant Examiner* — Quanglong N Truong
(74) *Attorney, Agent, or Firm* — K&L Gates LLP

(57) ABSTRACT

A method for reducing postprandial glucose from a balanced meal includes orally administering to an individual a composition containing mulberry extract together with the meal. The postprandial glucose is reduced relative to postprandial glucose from administering a corresponding composition comprising mulberry extract before subsequent administration of the balanced meal.

14 Claims, 1 Drawing Sheet

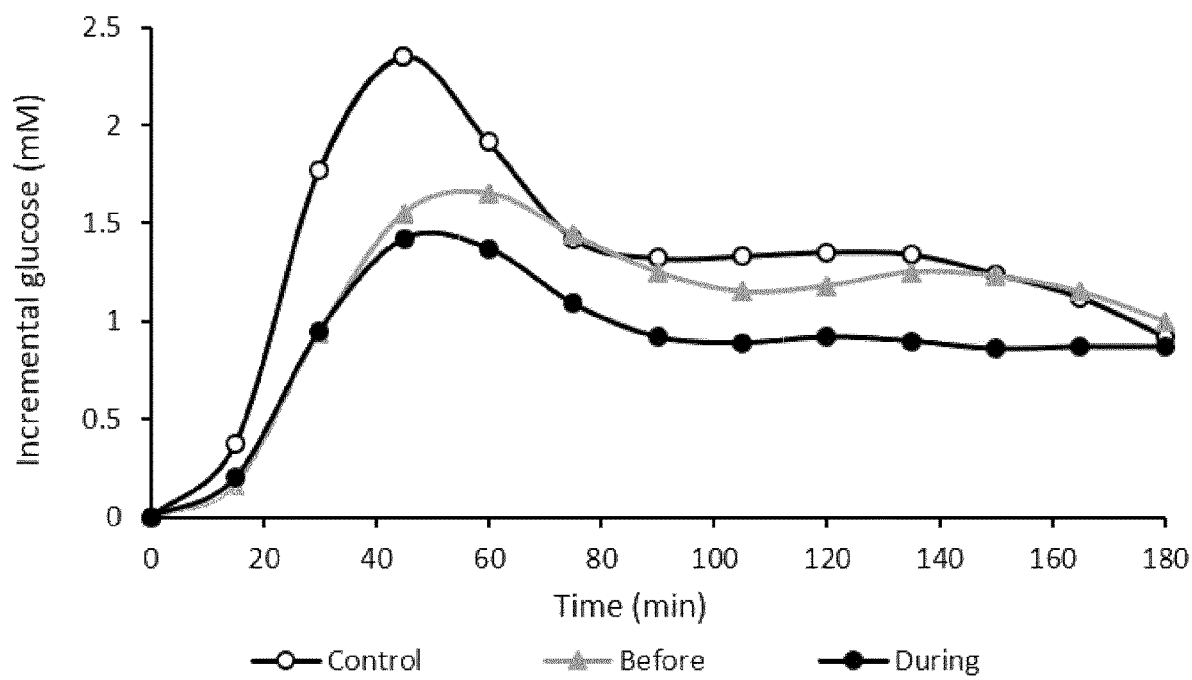

USE OF MULBERRY EXTRACT FOR CONTROLLING POSTPRANDIAL GLUCOSE RESPONSE

CROSS REFERENCE TO RELATED APPLICATIONS

The present application is a National Stage of International Application No. PCT/EP2021/060744, filed on Apr. 23, 2021, which claims priority to European Patent Application No. 20171278.3, filed on Apr. 24, 2020 and European Patent Application No. 20193063.3, filed on Aug. 27, 2020, the entire contents of which are being incorporated herein by reference.

The present invention generally relates to the use of a mulberry extract to decrease postprandial glucose (PPG) response. More particularly to the use of a mulberry extract, administered with a meal, to decrease postprandial glucose (PPG) response. The invention also relates to a composition comprising a mulberry extract, administered with, administration of a meal, for use in the treatment and/or prevention of a disorder linked to an increase in postprandial glucose in a subject.

BACKGROUND

Diabetes is a metabolic condition characterized primarily by high blood glucose levels that results from the body's inability to make or use insulin. Hyperglycemia can lead to numerous clinical complications including blindness, limb amputations, heart attack or stroke.

The most common types of diabetes are insulin-dependent diabetes (Type-1 diabetes T1D) and non-insulin-dependent diabetes (Type-2 diabetes T2D). T2D is by far the most abundant type, and the increase in Type-2 diabetes (T2D) is mainly driven by increasing obesity rates.

Additionally, pre-diabetic conditions, defined as having a blood glucose higher than normal but not high enough to be diagnosed as diabetic, are contributing significantly to the strong rise of the diabetic population.

Insulin resistance (a low insulin sensitivity) occurs also in pregnant subjects. This is due to hormonal changes that help to ensure the transfer of nutrients from the pregnant subject to the fetus. As described above, in response to insulin resistance the pancreas may secrete more insulin to compensate. These subjects are considered as having an impaired glucose tolerance (hereinafter IGT). Eventually the pancreas may fail to keep up with the body's increased need for insulin, leading to type-2 diabetes. Any degree of glucose intolerance with onset or first recognition during pregnancy is referred to as Gestational Diabetes Mellitus (GDM).

The pathophysiology of the development of Type-2 diabetes is complex and multifactorial. Obesity, sedentary life style, and/or increased age may lead to insulin resistance and to increased circulating insulin concentrations over time. At some point, a loss of control of blood glucose begins to emerge, resulting in impaired glucose tolerance (IGT) or impaired fasting glucose (IFG) and may ultimately result in Type-2 diabetes. Therefore, IGT and IFG refer to metabolic states intermediate between normal glucose homeostasis and diabetes.

A further test, the oral glucose tolerance test (OGTT), may be performed to assess whether the patient is diabetic or has IGT. The OGTT consists of a glucose drink containing 75 g of glucose. The patient's blood sugar level is measured at one and two hours following administration of the drink.

Glucose is an essential nutrient for the human body, so its circulating levels must be carefully maintained constant in order to supply adequate amounts to peripheral tissues. The liver plays a central role in glucose homeostasis by balancing uptake and storage of glucose via glycogenesis and its release via glycogenolysis and gluconeogenesis. An impairment of glucose homeostasis is a typical feature of Type-2 diabetes. Patients with Type-2 diabetes exhibit increased hepatic glucose production (HGP), which is identified as the main cause of fasting hyperglycemia and is associated with a reduced plasma glucose clearance (Gastaldelli A, et al., Diabetes 2000; 49:1367-1373), and also a 25-45% reduced synthesis of glycogen compared with non-diabetic subjects (Roden M, et al., Best Pract Res Clin Endocrinol Metab. 2003; 17:365-83).

Optimal glycemic control is fundamental to the management of diabetes. Both fasting plasma glucose (FPG) and postprandial plasma glucose (PPG) levels correlate with the risk of complications and contribute to the measured glycated hemoglobin (A1C) value. A1C levels >7.0% are associated with a significantly increase risk of both microvascular and cardiovascular (CV) complications. PPG is an important component of overall hyperglycemia and may be the predominant component in patients who are closer to A1C goal and in older adults.

PPG are determined by several factors, such as the total caloric value of a meal, macronutrient composition, and carbohydrate quality (e.g., glycemic index/load), all of which may be monitored and controlled. However, multiple other factors involved in diseases such as T2D are more complex because they cannot be controlled and are variable between individuals. These include gastric emptying rate, intestinal absorption rate, enteroendocrine incretin secretion, incretin sensitivity, pancreatic beta-cell insulin secretory function, hepatic glucose production, glucose effectiveness, glucose uptake in all tissues (especially brain, adipose, liver, and muscle), insulin sensitivity, and renal glucose reabsorption.

Limiting blood glucose peaks after a meal in diabetic subjects constitutes an important target of the overall glycemic control strategy. Uncontrolled PPG is common in diabetes. It contributes to overall hyperglycemia and is associated with poor outcomes. Treatment options that specifically target PPG are, therefore, critical components to achieving and sustaining glycemic control in patients with Type-1 diabetes (T1D) and Type-2 diabetes (T2D), and might prevent pre-diabetic subjects to advance to a diagnosed diabetic condition.

Evidences are revealing the importance of PPG and post-prandial insulin (PPI) in both the management and prevention of type 2 diabetes. PPG was shown to be the main contributor to total glucose fluctuations in T2D patients with HbA1c <8%, i.e. well controlled diabetes or prediabetes patients. Postprandialhyperinsulemia has been shown to be a marker of prediabetes and metabolic syndrome (M. Shanik et al., *Diabetes Care* 2008 February; 31(Supplement 2): S262-S268). Prediabetes state is rapidly increasing worldwide and is mainly associated with age and BMI. Controlling PPG and/or PPI response in the overweight and obese population, also at risk for T2D, appears to be key for preventing this disease.

Actual treatments for T2D comprise several classes of drugs, which can be used alone or in combination with insulin.

Alpha-glucosidase inhibitors slow the digestion of carbohydrates, delay glucose absorption, and reduce the increase in blood glucose after a meal. Common side effects include abdominal pain, diarrhea, and flatulence. The antidiabetic drug Acarbose is an alpha-glucosidase inhibitor. However, gastrointestinal side-effects have been reported, in particular flatulence and diarrhea, due to the fact that it also inhibits alpha-amylase activity.

Mulberry leaves have been used centuries in traditional Chinese medicine as a common agent to treat a variety of conditions including diabetes, atherosclerosis, cancer as well as for boosting the immune system through potent antioxidant activity. Research has shown that mulberry plant materials comprise various physiologically active components including flavonoids, polyphenols, polysaccharides, 1-deoxynojirimycin (DNJ) identified as α-glucosidase inhibitor, fagomine, GABA or the like.

WO2013/078658 reports effects of mulberry juice on blood glucose levels following consumption of high glycemic index carbohydrate. EP3145332 A1 reports reduction of post-meal glucose and insulin spikes following administration of a composition comprising a combination of white kidney bean extract (1,200 mg), white mulberry extract (600 mg) and green coffee extract (400 mg) administered 15 minutes before a carbohydrate meal.

There is a persisting need in the food industry to further improve the nutritional solutions provided to diabetic subjects or subjects at risk for developing type-2 diabetes.

Alternative solutions instead of taking capsules or pills to lower postprandial glucose response can be appealing for consumers and increase consumer compliance.

An object of the present invention is to improve the state of the art and to provide a new and advantageous nutritional solution for improving the PPG profile in a subject, particularly in a diabetic or a subject at risk for developing T2D.

SUMMARY

As set forth in greater detail later herein, the inventor conducted a study that surprisingly and unexpectedly showed that mulberry leaf extract (MLE) administered with a balanced meal provides a significant decrease in PPG compared to mulberry leaf extract (MLE) administered prior to a meal. Also surprisingly, it was found that the intake of a composition comprising MLE extract in the form of a powder or granulate added to a balanced meal provides a significant decrease in PPG compared to MLE, containing the same amount of 1-deoxynojirimycin (DNJ), administered as little as five minutes before the meal.

Accordingly, in a non-limiting embodiment, the present invention provides a method of reducing postprandial glucose from a meal. The method comprises administering a composition comprising mulberry extract (ME) to an individual together with a balanced meal.

In a preferred embodiment, the mulberry extract is a mulberry leaf extract (MLE).

In another aspect the present invention provides ME for use in the treatment and/or prevention of a disorder linked to an increase in PPG concentration in an individual, wherein the ME is provided with a balanced meal.

In a further aspect, the invention pertains to the use of ME to decrease PPG concentration in an individual, following consumption of a balanced meal, wherein the ME is provided with the balanced meal.

In an embodiment, the individual has at least one condition selected from the group consisting of overweight, obesity, diabetes, gestational diabetes mellitus (GDM) and pre-diabetes.

The ME extract is administered with the meal, i.e. during the meal, for example as part of the meal. Preferably the composition comprising the ME is in the form of a powder or granulate, that can be added to the meal, e.g. sprinkled on the meal. In a preferred embodiment the composition comprising the ME is administered in the form of a powder or granulate sprinkled on the balanced meal.

In an embodiment the composition can typically be administered to the individual in a serving that provides about 50 mg to about 2 g of ME per serving, for example about 100 mg to about 2 g ME/serving, preferably about 100 mg to about 1 g ME/serving, such as about 100 mg to about 500 mg ME/serving, such as about 250 mg ME/serving.

The ME can have a concentration of DNJ at least 1% wt/wt (dry weight), least 2% wt/wt, at least 3% wt/wt, at least 4% wt/wt, for example about 5% wt/wt. In another embodiment the ME can have a concentration of DNJ at least 5% wt/wt, for example at least 6% wt/wt. In an embodiment, the composition comprising ME comprises at least 1 mg DNJ per g dry weight of the composition, preferably at least 2 mg DNJ, preferably at least 3 mg DNJ, preferably at least 4 mg DNJ, more preferably at least 5 mg DNJ, such as at least 6 mg DNJ per g dry weight of the composition.

In an embodiment the composition is administered to the individual in a serving that provides about 1 mg to about 100 mg of DNJ per serving, for example about 5 mg to about 50 mg DNJ/serving, preferably about 10 mg to about 30 mg DNJ/serving, or about 10 mg to about 20 mg DNJ/serving such as about 10 mg to about 15 mg ME/serving, such as about 12.5 mg DNJ/serving.

In an embodiment, the composition comprising ME further comprises a soluble fibre. In a preferred embodiment the soluble fibre is selected from a polydextrose or a resistant starch. In an embodiment the composition comprises ME and soluble fibre in a ratio fibre:ME of from about 1:1 to about 20:1, preferably from about 4:1 to about 10:1.

In an embodiment, the postprandial glucose achieved by the administration of the composition comprising the ME with the balanced meal is lower than postprandial glucose achieved by the administration of a composition comprising ME, containing the same amount of DNJ, in the form of a drink, prior to the administration of the meal (e.g., administration of the ME about five to about thirty minutes before the meal).

In another embodiment, the present disclosure provides a method of treating or preventing at least one condition for which reduced PPG is beneficial. The method comprises orally administering a composition comprising ME to an individual in need thereof or at risk thereof, together with a balanced meal.

The at least one condition treated or prevented is preferably selected from the group consisting of obesity, pre-diabetes, type-2 diabetes and gestational diabetes mellitus.

Advantageously ME administered with a balanced meal according to the present invention provides a significant decrease in postprandial glucose compared to ME administered prior to (e.g. at least 5 minutes before) administration of the meal.

Additional features and advantages are described in, and will be apparent from, the following Detailed Description and the FIGURES.

BRIEF DESCRIPTION OF DRAWINGS

FIG. 1 is a graph showing postprandial glucose excursion (over baseline) over time for water 5 minutes before a standardized balanced meal "Control (white dots)"; mulberry leaf extract (MLE) diluted in water, consumed 5 minutes before a standardized balanced meal "Before (grey triangles)"; and MLE consumed with a standardized balanced meal "During (black dots)".

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

All percentages are by weight of the total weight of the composition unless expressed otherwise. Similarly, all ratios are by weight unless expressed otherwise. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth. Ranges defined using "between" include the referenced endpoints.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. "Consisting essentially of" means that the embodiment or component thereof comprises more than 50 wt. % of the individually identified components, preferably at least 75 wt. % of the individually identified components, more preferably at least 85 wt. % of the individually identified components, most preferably at least 95 wt. % of the individually identified components, for example at least 99 wt. % of the individually identified components.

Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

"Animal" includes, but is not limited to, mammals, which includes but is not limited to rodents, aquatic mammals, domestic animals such as dogs and cats, farm animals such as sheep, pigs, cows and horses, and humans. Where "animal," "mammal" or a plural thereof is used, these terms also apply to any animal that is capable of the effect exhibited or intended to be exhibited by the context of the passage, e.g., an animal benefitting from reduced postprandial glucose. While the term "individual" or "subject" is often used herein to refer to a human, the present disclosure is not so limited. Accordingly, the term "individual" or "subject" refers to any animal, mammal or human that can benefit from the methods and compositions disclosed herein.

The relative terms "improved," "reduced," "enhanced" and the like refer to the effects of the method disclosed herein on postprandial glucose, particularly the administration of a composition containing WPM before administration of a meal (e.g., about thirty minutes before the meal), relative to administration of an identically formulated meal but administered without the WPM (e.g., no WPM within about one hour of the meal) or relative to administration of an identically formulated meal concurrently with the WPM (i.e., at approximately the same time).

As used herein, the terms "treat" and "treatment" mean to administer a composition as disclosed herein to a subject having a condition in order to lessen, reduce or improve at least one symptom associated with the condition and/or to slow down, reduce or block the progression of the condition. The terms "treatment" and "treat" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The terms "treatment" and "treat" do not necessarily imply that a subject is treated until total recovery. The terms "treatment" and "treat" also refer to the maintenance and/or promotion of health in an individual not suffering from a disease but who may be susceptible to the development of an unhealthy condition. The terms "treatment" and "treat" are also intended to include the potentiation or otherwise enhancement of one or more primary prophylactic or therapeutic measures. As non-limiting examples, a treatment can be performed by a patient, a caregiver, a doctor, a nurse, or another healthcare professional. The terms "prevent" and "prevention" mean to administer a composition as disclosed herein to a subject is not showing any symptoms of the condition to reduce or prevent development of at least one symptom associated with the condition. Furthermore, "prevention" includes reduction of risk, incidence and/or severity of a condition or disorder. As used herein, an "effective amount" is an amount that treats or prevents a deficiency, treats or prevents a disease or medical condition in an individual, or, more generally, reduces symptoms, manages progression of the disease, or provides a nutritional, physiological, or medical benefit to the individual.

"Overweight" is defined for a human as a body mass index (BMI) between 25 and 30 kg/m$^2$. "Obese" is defined for a human as a BMI of at least 30 kg/m$^2$, for example 30-39.9 kg/m$^2$.

"Diabetes" encompasses both the type I and type II forms of the disease. Non-limiting examples of risk factors for diabetes include: waistline of more than 40 inches for men or 35 inches for women, blood pressure of 130/85 mmHg or higher, triglycerides above 150 mg/dl, fasting blood glucose greater than 100 mg/dl or high-density lipoprotein of less than 40 mg/dl in men or 50 mg/dl in women. Therefore, an "individual at risk of diabetes" may have one or more of these factors present.

"Pre-diabetes" means that the individual has at least one of the following characteristics: a glycated hemoglobin (A1C) level between 5.7 and 6.4 percent, a fasting blood glucose from 100 to 125 mg/dL (5.6 to 7.0 mmol/L), or a blood sugar level from 140 to 199 mg/dL (7.8 to 11.0 mmol/L).

As used herein, "administering" includes another person providing a referenced composition to an individual so that the individual can consume the composition and also includes merely the act of the individual themselves consuming a referenced composition.

As used herein, "subsequently" means at least about five minutes later, preferably at least about ten minutes later.

The terms "food," "food product" and "food composition" mean a composition that is intended for ingestion by an individual, such as a human, and that provides at least one nutrient to the individual. "Food" and its related terms include any food, feed, snack, food supplement, treat, meal substitute, or meal replacement, whether intended for a human or an animal. Animal food includes food or feed intended for any domesticated or wild species. In preferred embodiments, a food for an animal represents a pelleted, extruded, or dry food, for example, extruded pet foods such as foods for dogs and cats.

The terms "serving" or "unit dosage form," as used herein, are interchangeable and refer to physically discrete units suitable as unitary dosages for human and animal subjects, each unit containing a predetermined quantity of the composition comprising WPM disclosed herein in an amount sufficient to produce the desired effect, preferably in association with a pharmaceutically acceptable diluent, carrier or vehicle. The specifications for the unit dosage form depend on the particular compounds employed, the effect to be achieved, and the pharmacodynamics associated with each compound in the host. In an embodiment, the unit dosage form can be a predetermined amount of liquid housed within a container such as a bottle.

EMBODIMENTS

An aspect of the present disclosure is a method of reducing PPG from a meal. The method comprises orally administering a composition comprising ME to an individual with a balanced meal.

In another embodiment, the present disclosure provides a method of treating or preventing at least one condition for which reduced PPG is beneficial. The method comprises orally administering a composition comprising ME to an individual in need thereof or at risk thereof with a balanced meal. The at least one condition treated or prevented is preferably selected from the group consisting of pre-diabetes, type-2 diabetes (T2D).

In another aspect of the present disclosure provides a method of reducing post-prandial insulin (PPI) from a meal, comprising orally administering a composition comprising ME to an individual with a balanced meal.

In another embodiment, the present disclosure provides a method of treating or preventing at least one condition for which reduced PPI is beneficial. The method comprises orally administering a composition comprising ME to an individual in need thereof or at risk thereof with a balanced meal. The at least one condition treated or prevented is preferably selected from the group consisting of pre-diabetes, type-2 diabetes (T2D).

In a preferred embodiment, the composition comprising ME is orally administered to an individual in the form of a powder or granulate composition which is added to the meal, preferably sprinkled onto the meal.

As used herein, "meal" refers to one or more food products consumed at substantially the same time as each other; preferably such that one or more proteins, one or more carbohydrates, one or more fats and at least one micronutrient are provided by consuming the meal; more preferably such that one or more proteins, one or more carbohydrates, one or more fats, one or more vitamins and one or more minerals are provided by consuming the meal. Preferably the meal comprises a plurality of food products. As used herein "balanced meal" refers to meal which provides all of protein, carbohydrate, fat, vitamins and minerals, in quantities and proportions suitable to maintain health or growth of an individual. The quantities and proportions of protein, carbohydrate, fat, vitamins and minerals suitable to maintain health or growth may be determined in line with the current food and nutrition nregulations, and any specific requirements of the individual, for example based on age, physical activity, and/or gender. For example, the Food and Nutrition Board of the Institutes of Medicine (IOM) current energy, macronutrient, and fluid recommendations, recommend an acceptable macronutrient distribution range for carbohydrate (45%-65% of energy), protein (10%-35% of energy), and fat (20%-35% of energy) for active individuals. In an embodiment the balanced meal provides 45-65% of total calories from carbohydrate, 20-35% of total calories from fat and of total calories 10-35% from protein. In an embodiment, the meal provides 200 kcal to 1,000 kcal to the individual, preferably 250 kcal to 900 kcal, more preferably 300 kcal to 850 kcal, and most preferably 350 kcal to 800 kcal. The meal can be any meal, for example breakfast, lunch or dinner.

In some embodiments, the meal is breakfast. For example, the composition comprising the ME can be administered to the individual with breakfast. In other embodiments, the meal is lunch. In other embodiments, the meal is dinner (i.e. evening meal).

In an embodiment, the PPG achieved by the administration of the composition comprising the ME with the balanced meal is lower than the PPG achieved by the administration of a composition comprising the same amount of the ME extract (same amount of DNJ) before the administration of the balanced meal (e.g. administration of the ME at least five minutes before the meal, e.g. about five minutes to about 30 minutes before the meal).

Research has shown that mulberry plant extracts comprise various physiologically active components including flavonoids, polyphenols, polysaccharides, 1-deoxynojirimycin (DNJ) identified as α-glucosidase inhibitor, fagomine, GABA. 1-deoxynojirimycin (DNJ) is thought to be the main active ingredient acting through potent α-glucosidase inhibition.

The mulberry extract applicable to the present invention can be of any *Morus* origin, including, but not limited to, White Mulberry (*Morus alba* L.), Black Mulberry (*Morus nigra* L.), American Mulberry (*Morus celtidifolia* Kunth), Red Mulberry (*Morus rubra* L.), hybrid forms between *Morus alba* and *Morus rubra*, Korean Mulberry (*Morus australis*), Himalayan Mulberry (*Morus laevigata*), and combinations thereof.

The mulberry extract applicable to the present invention can be derived from different parts of mulberry tree, including barks (trunk, twig or root), roots, buds, twigs, young shoots, leaves, fruits or a combination thereof. The mulberry extract can be in the form of e.g. dried powders such as dried powders milled from different parts of the tree. The starting plant material of mulberry extracts can be fresh, frozen or dried mulberry materials. The extract may be used as a liquid or dried concentrated solid. Typically, such an extract includes from at least about 1% w/v 1-DNJ.

In a preferred embodiment, the mulberry extract (ME) is a mulberry leaf extract (MLE).

Mulberry extracts can be prepared by procedures well known in the art. References in this aspect can be made to Chao Liu et al., Comparative analysis of 1-deoxynojirimycin contribution degree to α-glucosidase inhibitory activity and physiological distribution in *Morus alba* L, *Industrial Crops and Products*, 70 (2015) p 309-315; Wenyu Yang et al., Studies on the methods of analyzing and extracting total alkaloids in mulberry, *Lishizhen Medicine and Material Medical Research*, 2008(5); and CN104666427.

Mulberry leaf extracts are also commercially available, such from Karallief Inc, USA, ET-Chem.com, China, Nanjing NutriHerb BioTech Co., Ltd, China, or from Phynova Group Ltd.

The compositions of the present invention may typically comprise from about 1% to about 50%, including from about 2% to about 30%, such as from about 5% to about 20%, and also including from about 10% to about 15% of mulberry extract by weight of the composition.

In one embodiment of the present invention the composition comprises at least 1 mg 1-deoxynojirimycin (DNJ) per g dry weight, preferably at least 1 mg DNJ per g dry weight of the composition, preferably at least 2 mg DNJ, preferably at least 3 mg DNJ, preferably at least 4 mg DNJ, more preferably at least 5 mg DNJ, such as at least 6 mg DNJ per g dry weight of the composition. In one embodiment of the present invention the composition comprises about 1 to about 20 mg DNJ per g dry weight of the composition, preferably about 2 mg to about 10 mg DNJ per g dry weight of the composition, In one embodiment of the present invention the composition comprises about 5 to about 10 mg DNJ per g dry weight of the composition, preferably about 5 mg to about 8 mg DNJ per g dry weight of the composition, such as about 6 mg to about 7 mg DNJ per g dry weight of the composition.

In an embodiment, the composition is administered to an individual in a serving that provides at least about 1 mg DNJ, preferably at least about 5 mg DNJ per serving, more preferably at least about 10 mg DNJ per serving. In some embodiments, up to 50 mg DNJ are administered per serving of the composition. In some embodiments, up to 100 mg DNJ may be administered per serving of the composition.

The composition comprising ME according to the invention is intended to be consumed with a balanced meal. It may be added to, or mixed into, the meal, or may be consumed in accompaniment to the meal. In a preferred embodiment the composition comprising ME according to the invention is in the form of a powder or granulate intended to be added to, or mixed into, the meal, preferably sprinkled onto the meal. It has surprisingly been found by the present inventors that that the intake of a composition comprising MLE extract (about 12.5 mg DNJ) in the form of a powder or granulate sprinkled onto a balanced meal provides a significant decrease in postprandial glucose compared to a composition comprising MLE, containing the same amount of DNJ, administered before the subsequent administration of the meal (e.g administered five minutes or more before the meal).

The format of the ME compositions can contain excipients, emulsifiers, stabilizers and mixtures thereof, and the final formulation is preferably, in a powder/granulate format.

The compositions of the present invention may further comprise a filler material to augment the bulk properties of the compositions. These filler materials may include any such material that is suitable for use in a composition.

The filler material may include any nutritional or non-nutritional ingredient that adds bulk, and in most instances will be substantially inert, and does not significantly negate the blood glucose benefits of the composition. The filler material most typically includes a fiber and/or carbohydrate having a low glycemic index.

The filler material, including any carbohydrate and/or fiber filler material, may represent enough of the finished product to provide the desired bulk or flow properties, but most typically represent from about 30% to about 95%, preferably from about 40% to about 95%, more preferably from about 50% to about 90%, and most preferably from about 75% to about 90%, by weight of the composition.

Carbohydrate sources suitable for use as a filler material in the compositions of the present invention, include those having a low glycemic index such as fructose and low DE maltodextrins as such ingredients do not introduce a high glycemic load into the composition. Other suitable filler material includes any dietary fiber suitable for human or animal use, including soluble and insoluble fiber, especially soluble fibres. Beneficial effects of soluble fibres on glucose response have been widely reported. Non-limiting examples of suitable soluble fibres include FOS, GOS, inulin, resistant maltodextrins, partially hydrolysed guar gum, polydextrose and combinations thereof.

Non limiting example of commercially available filler materials for use herein include Sunfiber® (Taiyo International, Inc.), which is a water-soluble dietary fiber produced by the enzymatic hydrolysis of Guar beans; Fibersol 2™ (Archer Daniels Midland Company), which is a digestion resistant maltodextrin; and polydextrose.

In an embodiment the compositions of the present invention comprise a mulberry extract and a soluble fibre. In a preferred embodiment the composition containing ME according to the present invention is in the form of a powder or granulate further comprising a soluble fibre selected from polydextrose, a resistant maltodextrin (such as the soluble corn fiber Fibersol-2) and combinations thereof.

The composition may also comprise other filler, stabilizers, anti-caking agents, anti-oxidants or combinations thereof.

The composition comprising the ME may further comprise one or more additional components such as minerals; vitamins; salts; or functional additives including, for example, palatants, colorants, emulsifiers, antimicrobial or other preservatives. Non-limiting examples of suitable minerals for the compositions disclosed herein include calcium, phosphorous, potassium, sodium, iron, chloride, boron, copper, zinc, magnesium, manganese, iodine, selenium, chromium, molybdenum, fluoride and any combination thereof. Non-limiting examples of suitable vitamins for the compositions disclosed herein include water-soluble vitamins (such as thiamin (vitamin B1), riboflavin (vitamin B2), niacin (vitamin B3), pantothenic acid (vitamin B5), pyridoxine (vitamin B6), biotin (vitamin B7), myo-inositol (vitamin B8) folic acid (vitamin B9), cobalamin (vitamin B12), and vitamin C) and fat-soluble vitamins (such as vitamin A, vitamin D, vitamin E, and vitamin K) including salts, esters or derivatives thereof. Vitamin C, vitamin D, vitamin B3 and/or vitamin B12 are particularly useful in the composition. In a preferred embodiment the composition is supplemented with one or more vitamin and/or mineral selected from vitamin C, vitamin B3, zinc or any combination thereof. In another preferred embodiment the composition is supplemented with one or more vitamin and/or mineral selected from vitamin D and chromium, or a combination thereof. The vitamin D is preferably in the form of vitamin D3.

In an embodiment, the composition is administered to an individual in a serving that provides at least about 10 mg DNJ per serving, for example about 12.5 mg DNJ per serving, and about 0.5 µg to about 1.5 µg vitamin D per serving, for example about 0.75 µg vitamin D preserving and about 0.05 mg to about 0.15 mg chromium per serving, for example about 0.075 mg chromium per serving.

The individual may be a mammal such as a human, canine, feline, equine, caprine, bovine, ovine, porcine, cervine or a primate. Preferably the individual is a human.

All references herein to treatment include curative, palliative and prophylactic treatment. Treatment may also include arresting progression in the severity of a disease. Both human and veterinary treatments are within the scope of the present disclosure. Preferably the composition comprising the ME is administered in a serving or unit dosage form that provides a therapeutically effective or prophylactically effective amount of the ME, particularly that that provides a therapeutically effective or prophylactically effective amount of DNJ.

In view of the above, an embodiment provided herein is a method of reducing glucose response of a meal, the method comprising: orally administering to an individual a composition comprising ME with a balanced meal.

The PPG in the individual is preferably reduced relative to postprandial glucose from oral administration of a composition comprising ME comprising the same amount of DNJ, administered before (e.g. at least 5 minutes before) the administration of the meal.

The individual preferably has at least one condition selected from the group consisting of obesity, type-2 diabetes, type-1 diabetes, pre-diabetes and gestational diabetes mellitus. The composition comprising the ME is preferably a powder. The composition can preferably be administered to the individual in a serving comprising about 50 mg to about 2 g of ME per serving, for example about 100 mg to about 2 g ME/serving, preferably about 100 mg to about 1 g ME/serving, such as about 100 mg to about 500 mg ME/serving, such as about 250 mg ME/serving.

The composition can preferably be administered to the individual in a serving comprising about 1 mg to about 100 mg of DNJ per serving, for example about 5 mg to about 50 mg DNJ/serving, preferably about 10 mg to about 30 mg DNJ/serving, or about 10 mg to about 20 mg DNJ/serving such as about 10 mg to about 15 mg ME/serving, such as about 12.5 mg DNJ/serving. The composition can comprise the ME and at least one additional component selected from the group consisting of a soluble fibre, vitamins and minerals.

In a preferred embodiment the mulberry extract is a mulberry leaf extract (MLE) comprising at least 5% by weight of DNJ.

The meal can be any balanced meal, for instance a breakfast, lunch or dinner meal.

Another embodiment provided herein is a method of treating or preventing a condition for which reduced postprandial glucose from a meal is beneficial, the method comprising: orally administering to the individual a composition comprising mulberry extract (ME) together with a balanced meal. The condition is preferably selected from the group consisting of obesity, pre-diabetes, diabetes.

In another embodiment the invention pertains to a composition comprising mulberry extract for use in the treatment and/or prevention of a disorder linked to an increase in plasma PPG concentration in an individual in need thereof or at risk thereof, wherein the ME are provided with a balanced meal.

The disorder may be selected from the group consisting of metabolic syndrome, glucose intolerance, pre-diabetes, gestational diabetes mellitus and diabetes type-2. In an embodiment the individual in need thereof or at risk thereof may be an overweight or obese individual.

In a preferred embodiment, the composition comprising ME is for use in an obese, pre-diabetic or diabetic patient. A "pre-diabetic patient" is a subject showing insulin resistance or impaired glucose tolerance and is predisposed, for example by family history or genetics, for developing type-2 diabetes later in life. The use of a composition comprising mulberry leaf administered with a meal according to the invention would consequently reduce the risk and/or the development of insulin resistance, metabolic syndrome, glucose intolerance and type-2 diabetes in those subjects.

In a further aspect, the invention pertains to the use of mulberry extract to decrease plasma postprandial glucose concentration in an individual, following a balanced meal, wherein the mulberry extract is provided with the meal (e.g. in a powder/granulate form added to the meal).

In an embodiment, the individual has at least one condition selected from the group consisting of obesity, diabetes and pre-diabetes.

In an embodiment, the ME is administered to an individual in a serving that provides at least about 5 mg DNJ, preferably at least about 10 mg DNJ.

NON-LIMITING EXAMPLES

Example 1

The following non-limiting example presents clinical data developing and supporting the concepts of the present invention.

The effects of mulberry extract on post-prandial glucose response of a standardized balanced meal, when taken just before or with a meal, was tested in 30 subjects in a controlled crossover trial. Subjects consumed either (a) 200 ml of water (control), consumed 5 minutes before a standardized balanced meal, (b) a mulberry leaf extract (250 mg mulberry leaf extract, standardized to contain 5% by weight of DNJ) dissolved in 200 ml water, consumed 5 minutes before the standardized balanced meal, or (c) mulberry leaf extract in powder form (250 mg mulberry leaf extract, standardized to contain 4.5-5% by weight of DNJ), added to the standardized complete meal. Subcutaneous interstitial glucose concentration was measured before (fasting glucose) and after consumption of the test products and the standardized meal (up to 180 min) using a continuous glucose monitoring system (FreeStyle Libre®, Abbott).

The standardized balanced meal consumed by the test subjects comprised boiled white rice, white bread, sauce and chicken as a protein source (approximately 75 g uncooked rice, 25 g bread, 80 g curry sauce and 80 g chicken) to contain 55-65 kcal % carbohydrate, and at least 15 kcal % protein and 15 kcal % fat content.

The study population was 30 healthy adult males and females (19 women, 11 men), BMI 20.4-27.8 kg/m$^2$.

FIG. 1 illustrates the change in interstitial glucose level (average of 30 subjects) over time with water 5 minutes before a standardized balanced meal "Control"; mulberry leaf extract (MLE) diluted in water, consumed 5 minutes before a standardized balanced meal "Before"; and MLE powder added to a standardized balanced meal "During". Time 0 correspond to ingestion of the standardized balanced meal.

Mulberry leaf extract (MLE) administered both just before and during the standardized meal reduced significantly iCmax of the postprandial glucose curve compared with the control (During: −0.84 mM, p<0.01; Before: −0.56 mM, p<0.01). Tmax was also significantly delayed for both the MLE administered before and during the standardized meal groups compared to the control.

MLE administered 5 minutes before the meal and with the meal also decreased significantly postprandial glucose iAUC compared to the control (Before: −16%, p<0.01; During: −32%, p<0.01). Surprisingly, postprandial glucose iAUC with MLE administered with the standardized balanced meal (During) was significantly lower than postprandial glucose iAUC observed for MLE administered before the standardized balanced meal (Before) (−19%, p<0.01).

These results show that administration of MLE with a meal significantly reduces the postprandial glucose response (PPG) and demonstrates that MLE administered with a balanced meal was more efficient to decrease post-prandial glucose than MLE administered 5 minutes before a balanced meal.

Example 2

The following non-limiting Example provides an examples of compositions comprising MLE suitable for use according to the present invention.

Example 2A

| Ingredient | % by weight |
| --- | --- |
| Mulberry Leaf Extract (standardized to contain 5% by weight of DNJ) | 13.125 |
| Calcium Carbonate (flow agent) | 0.020 |
| Chromium Picolinate (source of chromium) | 0.064 |
| Vitamin D3 | 0.00075 |
| Polydextrose | Remainder to 100% |
| TOTAL | 100.000000 |

Example 2B

| Ingredient | % by weight |
| --- | --- |
| Mulberry Leaf Extract (standardized to contain 5% by weight of DNJ) | 12.50 |
| Calcium Carbonate (flow agent) | 1.00 |
| Chromium Picolinate (source of chromium) | 0.03 (0.075 g chromium/ 2 g serving) |
| Vitamin D3 (100000 IU) | 0.015 (0.75 µg Vit D3/2 g serving) |
| Fibersol-2 ™ (resistant maltodextrin) | Remainder to 100% |
| TOTAL | 100.00 |

Example 3

Randomized, double-blind, crossover study evaluating the effects of MLE composition consumed with a meal on Post-Prandial Glycemic (PPG) response in patients with Type 2 Diabetes.

The effects of mulberry extract on post-prandial glucose response of a meal, when taken with a meal, compared to placebo (confirmative) and active control (acarbose) is tested in pateints with Type-2 diabetes in a controlled crossover trial. Subjects consumed either (a) placebo (negative control) powder sprinkled on the test meal, (b) a mulberry leaf extract composition (250 mg mulberry leaf extract, standardized to contain 5% by weight of DNJ) (2 g of composition according to Example 2 (2B)) sprinkled on the test meal (test product), or (c) Acarbose 100 mg tablet (active control) consumed with the test meal.

Participants are split into three approximately equal size groups and randomized to either sequence ABC, BCA or CAB where A=test, B=placebo, C=acarbose. The study duration is approximately 6 months. Participants are enrolled in the study for up to 32 days with a screening period of up to 2 weeks, 3 treatment visits and a washout period of 1 week (±4 days) between visits. Participants are evaluated at the study site at Screening (Day −14 to −1), Visit 1 (Day 1), Visit 2 (Day 7±4), and Visit 3 (Day 14±4). The investigational product (test product, matching placebo or acarbose) is consumed together with a standardized, mixed meal in the morning of the study visit after a fasting period of at least 10 hours. The participants are asked to eat the entire test meal within approximately 15 min. Blood samples are drawn pre-meal (−30 min, and just before start of the meal [−15 min]) and directly after completion of the meal (t=0 min), and post-meal (15, 30, 45, 60, 90, 120, 150, 180, and 240 min), to assess glycemic parameters and paracetamol concentration. Observations include incremental area under the curve (iAUC 0-3h) of post-prandial glycemic excursion induced by the standardized meal together with sprinkled format MLE composition (test product) relative to the raise in post-prandial glycemic excursions observed when placebo is given with the meal.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of reducing postprandial glucose from a balanced meal, the method comprising:
   orally administering to an individual a composition comprising a mulberry extract (ME) with the balanced meal, wherein the mulberry extract has a concentration of 1-deoxynojirimycin (DNJ) of at least 5% wt/wt.

2. The method of claim 1, wherein the individual has at least one condition selected from the group consisting of overweight, obesity, type-1 diabetes, type-2 diabetes, gestational diabetes mellitus, and pre-diabetes.

3. A method of treating at least one condition for which reduced postprandial glucose and/or postprandial insulin from a meal is beneficial, the method comprising:
orally administering to an individual in need thereof or at risk thereof a composition comprising a mulberry extract (ME) with a balanced meal, wherein the mulberry extract has a concentration of 1-deoxynojirimycin (DNJ) of at least 5% wt/wt; and wherein the at least one condition is selected from the group consisting of overweight, obesity, pre-diabetes, gestational diabetes mellitus, and diabetes.

4. The method of claim 3, wherein the composition comprising the ME is in the form of a powder or granulate, and is mixed into or added onto the balanced meal.

5. The method of claim 3, wherein the composition is administered to the individual in a serving comprising about 1 mg up to about 100 mg of 1-deoxynojirimycin (DNJ) per serving.

6. The method of claim 3, wherein the composition comprises the mulberry extract and at least one additional component selected from the group consisting of a fibre, a vitamin, a mineral, and any combination thereof.

7. The method of claim 3, wherein the mulberry extract is a mulberry leaf extract.

8. The method of claim 3, wherein the postprandial glucose in the individual is reduced relative to postprandial glucose following administration of a composition comprising mulberry extract containing the same amount of DNJ, when administered before the balanced meal.

9. The method of claim 1, wherein the balanced meal provides 45-65% of total calories from carbohydrate, 20-35% of total calories from fat, and 10-35% of total calories from protein.

10. The method of claim 3, wherein the balanced meal provides 45-65% of total calories from carbohydrate, 20-35% of total calories from fat, and 10-35% of total calories from protein.

11. The method of claim 1, wherein the balanced meal provides 200 kcal to 1000 kcal to the individual.

12. The method of claim 3, wherein the balanced meal provides 200 kcal to 1000 kcal to the individual.

13. The method of claim 1, wherein the composition further comprises a soluble fibre selected from polydextrose, a resistant maltodextrin, and a combination thereof.

14. The method of claim 3, wherein the composition further comprises a soluble fibre selected from polydextrose, a resistant maltodextrin, and a combination thereof.

* * * * *